(12) United States Patent
Nguyen et al.

(10) Patent No.: US 11,606,299 B2
(45) Date of Patent: Mar. 14, 2023

(54) METHOD FOR REDUCING IMPACT OF FLAPPING LINKS ON PERFORMANCE OF NETWORK DEVICES

(71) Applicant: VIETTEL GROUP, Ha Noi (VN)

(72) Inventors: Hanh Trang Nguyen, Ha Noi (VN); Van Huong Tran, Nam Dinh Province (VN)

(73) Assignee: VIETTEL GROUP, Ha Noi (VN)

( * ) Notice: Subject to any disclaimer, the term of this patent is extended or adjusted under 35 U.S.C. 154(b) by 262 days.

(21) Appl. No.: 17/139,081

(22) Filed: Dec. 31, 2020

(65) Prior Publication Data
US 2021/0409331 A1 Dec. 30, 2021

(30) Foreign Application Priority Data
Jun. 30, 2020 (VN) ................. 1-2020-03818

(51) Int. Cl.
*H04L 47/125* (2022.01)
*H04L 45/00* (2022.01)
*H04L 43/0882* (2022.01)

(52) U.S. Cl.
CPC ........ *H04L 47/125* (2013.01); *H04L 43/0882* (2013.01); *H04L 45/70* (2013.01)

(58) Field of Classification Search
CPC .... H04L 47/125; H04L 43/0882; H04L 45/70
See application file for complete search history.

(56) References Cited

U.S. PATENT DOCUMENTS

| | | | |
|---|---|---|---|
| 9,838,317 B1* | 12/2017 | Yadav | H04L 47/127 |
| 2008/0215910 A1* | 9/2008 | Gabriel | H04L 45/22 |
| | | | 714/E11.071 |
| 2009/0046579 A1* | 2/2009 | Lu | H04L 45/28 |
| | | | 370/225 |
| 2010/0080115 A1* | 4/2010 | Yang | H04L 41/0681 |
| | | | 370/216 |
| 2010/0246384 A1* | 9/2010 | Bullappa | H04L 43/0811 |
| | | | 370/221 |
| 2011/0016258 A1* | 1/2011 | Stewart | H04L 49/00 |
| | | | 710/316 |
| 2014/0006862 A1* | 1/2014 | Jain | G06F 11/0736 |
| | | | 714/26 |
| 2015/0222557 A1* | 8/2015 | Bhattacharya | H04L 45/22 |
| | | | 370/237 |
| 2016/0301597 A1* | 10/2016 | Jayakumar | H04L 45/245 |
| 2018/0006875 A1* | 1/2018 | Floyd, III | H04L 43/0811 |
| 2018/0367385 A1* | 12/2018 | Rai | H04L 41/0816 |
| 2021/0119917 A1* | 4/2021 | Yu | H04L 45/12 |
| 2021/0160148 A1* | 5/2021 | Kolar | H04L 12/2854 |
| 2021/0168201 A1* | 6/2021 | Doan | H04L 47/125 |
| 2021/0250228 A1* | 8/2021 | Prakash | H04L 41/065 |
| 2021/0409331 A1* | 12/2021 | Nguyen | H04L 47/125 |
| 2022/0159108 A1* | 5/2022 | Li | H04L 45/28 |

* cited by examiner

*Primary Examiner* — Chi H Pham
*Assistant Examiner* — Vladislav Y Agureyev
(74) *Attorney, Agent, or Firm* — PatentTM.US

(57) ABSTRACT

The method for reducing impact of flapping links on performance of network devices is implemented in 3 steps: Step 1: initialize a number of points of the interface to define interface status; Step 2: add a number of points to T and change interface status to isolated; Step 3: the interface comes back to normal state; By all those steps above, the routers can reduce impact of flapping links on route calculation and its performance.

1 Claim, 1 Drawing Sheet

METHOD FOR REDUCING IMPACT OF FLAPPING LINKS ON PERFORMANCE OF NETWORK DEVICES

FIELD OF THE DISCLOSURE

The subject disclosure is related to a method for reducing impact of flapping links on performance of network devices. This method diminishes effects of flapping links on routing protocols and routing table calculation inside IP network devices.

BACKGROUND OF THE DISCLOSURE

Link flapping is a condition where a connection between network devices alternates between up and down states in a short period.

In fact, an interface on a network device has two status: up and down. When the interface status changes from up to down or vice versa, this event is sent to routing application on the device. After that, the routing application will recalculate and send new routes to the routing table. Changes in the routing table will be sent to adjacent network devices. By receiving this notification, an adjacent router continues to recalculate its own routing table, forward changes to its neighbors and so on. In short, a notification is sent to routing applications each time an interface changes its status and causes routing table recalculation. In case the link between devices is flapping, all routers in the network will continuously recalculate their routing tables and send out update messages. If the routing table is large enough, the issue is more severe because routing recalculation can cause resources to be exhausted and system overload.

In the above, the network interface is the physical port directly connected between routers; routing is route calculation internally inside a router to find the best routes for traffic from one router to another; routing protocol is the method for exchanging routing information between routers; router is a network device which is able to exchange IP messages between IP network; adjacent router is the router that connects directly to the previous mentioned router.

DESCRIPTION

The subject disclosure describes the method for reducing impact of flapping links on performance of network devices in the following steps:

Step 1: initialize interface monitoring, initialize a point container of the interface; at this step, initialize point T0 at interface initialization or reuse.

Step 2: increase a number of points to the interface and change interface status to isolated state; at this step, when interface status changes from up to down or vice versa, if total point of the interface exceeds a predefined threshold, the interface is put to isolated status.

Step 3: Put interface in normal state; at this step, total point of the interface decreases if the interface is in stable operation, when it decays to reuse threshold, the interface is put to normal state.

Regarding this method, the router will put the flapping interface in isolation and does not inform status changes to the routing application until the interface is back to stable operation. Therefore, all routers within the same network don't have to excessively calculate routing tables and consider the flapping interface as down.

BRIEF DESCRIPTIONS OF THE DRAWINGS

Figure 1:
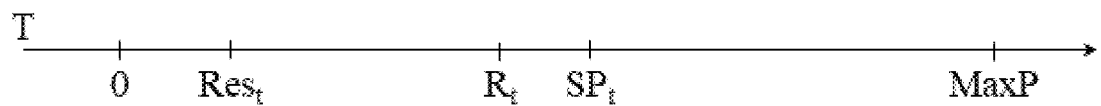
Figure 2:
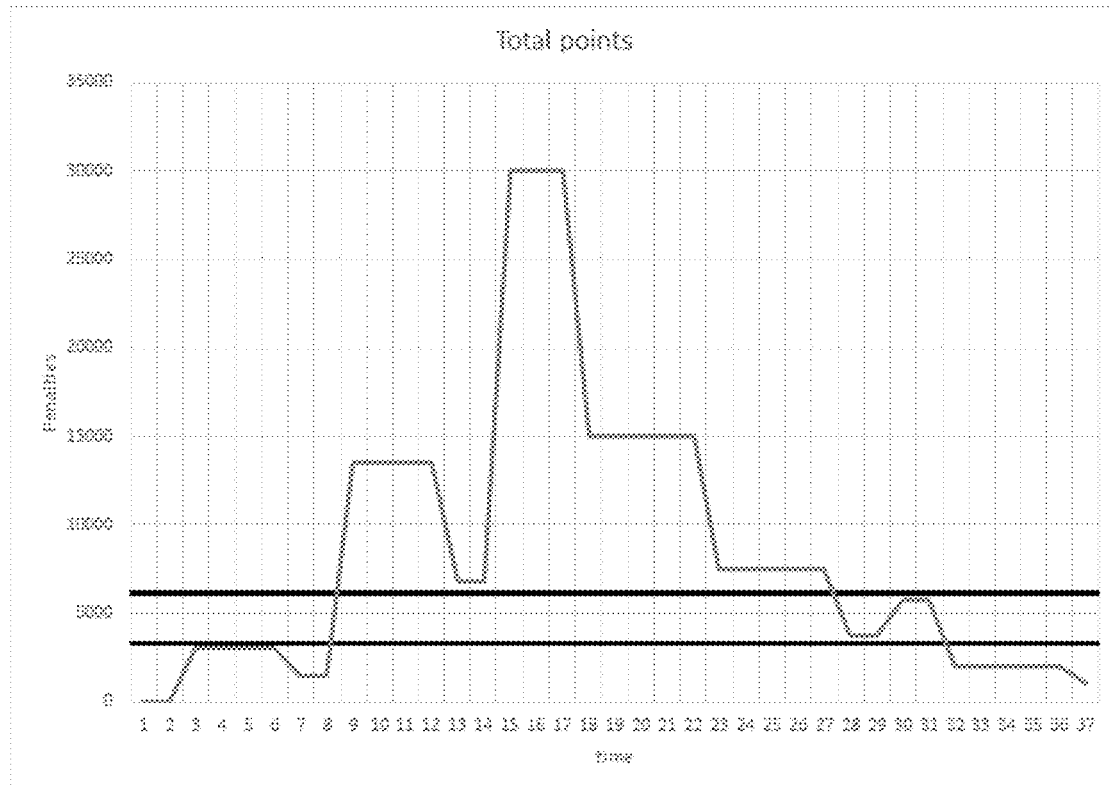

FIG. 1 depicts all thresholds; and
FIG. 2 depicts variance of total points of a fluctuated interface in illustrated example.

DETAIL DESCRIPTION

The subject disclosure proposes to add a penalty to the total points of the monitored interface each time the interface changes its status Up to Down or vice versa. When the total points exceeds a suppress threshold, the interface is isolated. While in this state, all changes in interface status do not send any notification to the routing application on the router, hence do not cause routing recalculation as well as sending notifications to adjacent routers. The router considers the isolated interface as Down. The total point of the interface decays after a period of time. When it decreases below reuse threshold, the interface is back to normal state. Regarding to FIG. 1 and FIG. 2, this disclosure propose the below parameters:

Total points: Each interface is assigned a number of points. The point increases when the interface status changes, decreases when the interface stays stable. The isolated status is decided based on the number of points. The point is initialized at two moments:

Feature initialized: the total number of points T=0
Device reset: the total number of points T=Rest Penalty points: When the interface changes its status from Up to Down, a pre-defined number of points will be added into total points of the interface Isolation threshold: When total points of the interface reach to isolation threshold, the interface is put into isolated state. While in isolation, each time the interface changes its status from Up to Down, the pre-defined number of points will be added into total points of the interface, but the event of status changes will not be sent to the routing application and routing table on the device.

Halflife: after each period of halflife, the total points decay by half. If total point is below reuse threshold, the interface will return to normal state.

Reuse threshold: When total point is below reuse threshold, the interface will return to normal state. Every change in interface status will be sent to CPU of the network device Maximum isolation threshold: this parameter is used to calculate the maximum total points of the interface as below:

$$\mathrm{Max}P = R_t * (\mathrm{Max}SP_t / \mathrm{HL}_p)^2$$

When total points of the interface reached its maximum threshold, each time the interface changes its status, the total point stays the same. After each halflife period, the total point decays by half Restart threshold: when the device restarts, each interface is assigned a number of points equal to this restart threshold The method for reducing impact of flapping links on performance of network devices is implemented in detail as below:

Step 1: initialized a number of points of the interface to define interface status In fact, initializing a number of points of the interface is to create variant T regarded to the interface. Value of T is described as below:

T0=0 if start to monitor the interface
T0=Rest if the interface is monitored before the device started Step 2: add a number of points to T and change interface status to isolated;

At t2, each time the interface changes its status from Down to Up, T stay unchanged. However, each time the interface changes its status from Up to Down (t1 and t3), add P to T.

At t1: the interface changes its status from Up to Down:

$T(t_1)=T_0+P$

At t2: the interface changes its status from Down to Up $(t2-t1<HL_p)$ $T(t_2)=T(t_1)$ At t3: the interface changes its status from Up to Down $(t3-t1<HL_p)$ $T(t_3)=T(t_2)+P$ At arbitrary time, when T reaches SPt, interface status is changed to isolated, at which the routing application is not informed about interface status changes until it comes back to stable operation.

At arbitrary time, when T reaches maximum (T=MaxP), interface is in isolated state, the router considers interface in Down state. When the link is flapping, the interface switches between Up and Down state, it won't send events to the CPU of the router, and T doesn't increase anymore.

Step 3: the interface comes back to normal state.

If the link continues to flap, T at MaxP does not increase, interface is in isolated state. If the interface is stable, after each halflife, T decays by half. At times when T decreases at Rt (T=Rt), interface exits isolated state and comes back to normal, the router recognizes operation of the interface in reality. When the interface changes between Up and Down states, an event will be send to the CPU of the router, the router will calculate its routing table as normal.

By all those steps above, the routers can reduce impact of flapping links on route calculation and its performance.

Example

Example on reducing impact of flapping links on performance of network devices

All parameters in the example are assigned the below values:

| Parameters | Abbreviation | Value |
| --- | --- | --- |
| Total points | T | at the moment of feature initialization: T = 0 at the moment of device restarting: T = Rest |
| Penalties | P | 1000 |
| Isolation threshold | SPt | 8000 |
| Halflife | HLp | 5 |
| Restoration threshold | Rt | 6000 |
| Maximum isolation period | MaxSPt | 125 |
| Maximum point | MaxP | 30000 |
| Initiation point | Rest | 2000 |

While connection is flapping:

| Time (second) | Event | Result |
| --- | --- | --- |
| 0 | initialization | T = 0 |
| 2 | 3 flaps | T = 3000 |
| 5 | End of halflife | T = 1500 |
| 7 | 12 flaps | T = 13500 Interface is in isolation state and considered as Down. All status changes is not informed to CPU |
| 10 | End of half life | T = 6750 Interface is still in isolation state |
| 12 | 25 flaps | T = 30000 Interface is still in isolation state |
| 14 | 5 flaps | T = 30000 Interface is still in isolation state. T stays unchanged because it has reached MaxP |
| 15 | End of halflife | T = 15000 Interface is still in isolation state |
| 20 | End of halflife | T = 7500 Interface is still in isolation state |
| 25 | End of halflife | T = 3750 Interface is back to normal state. If the interface changes its status between Up and Down, an event will be sent to CPU |
| 27 | 2 flaps | T = 5750 Interface is still in normal state. The router calculates its routing table twice |
| 29 | The router restarts | T = 2000 Interface is in normal state |
| 34 | End of halflife | T = 1000 Interface is in normal state |

Efficiency

Method for reducing impact of flapping links on performance of network devices provides the below efficiencies:

Reduce load on routers: prevent routers from processing and calculating routing table because of interface flapping; prevent neighbor routers from processing and calculating routing table because of routes changes propagation.

Faster convergence: shorten conversion time and assure stable operation for the whole network by isolating connection failure, prevent failure event messages from propagation. Other routers can converge faster because their routing tables are not re-calculated after each link flapping.

Enhance network stability: the router isolates flapping interface from network, hence other routers in the network has faster convergence because they will prevent traffic from passing through the flapping interface until it becomes stable.

The invention claimed is:

1. A method for reducing impact of flapping links on performance of network devices comprising the steps of:

Step 1: initializing a number of points assigned to an interface to define an interface status of the interface, wherein said initializing comprises providing a variant T related to the interface, wherein a value of T is described as below:

T0="0" if starting to monitor the interface,

T0=a restart value of points, "Rest" if the interface is monitored before the network device started, Step 2: add an isolation number of points to T and change the interface status to "isolated";

At a time t2, each time the interface changes its status from "Down" to "Up", maintaining T unchanged; However, each time the interface changes its status from "Up" to "Down" at either of a time t1 or a time t3, adding a penalty value of points P to T, wherein At the time t1: if the interface change its status from "Up" to "Down":

$$T(t_1)=T_0+P$$

At the time t2: if the interface changes its status from "Down" to "Up" (t2−t1<a halflife value of points, $HL_p$)

$$T(t_2)=T(t_1)$$

At t3: if the interface changes its status from "Up" to "Down" (t3−t1<$HL_p$)

$$T(t_3)=T(t_2)+P$$

at an arbitrary time, when T reaches an isolation threshold value of points SPt, the interface status is changed to an "isolated" status, and a routing application is not informed about any interface status changes until the interface comes back to a stable operation;

at the arbitrary time, when T reaches a maximum MaxP, when the interface is in the "isolated" status, the routing application considers the interface to be in the "Down" status, when the interface status is flapping, the interface switches between "Up" and "Down" status, not sending interface status events to the routing application, and not increasing T anymore;

Step 3: the interface comes back to normal state:

If the interface status continues to flap, not adding points to T at MaxP, setting the interface status to "isolated", if the interface is stable, after passage of time of each halflife, decreasing the number of points of T by half, at times when T decreases at a restoration threshold Rt (T=Rt), changing the interface status from "isolated" to "normal", whereupon the router application observes operation of the interface in reality, wherein when the interface status changes between "Up" and "Down" states, sending interface status events to the routing application, and the routing application will calculate a routing table as normal, whereby by the steps above, the router can reduce impact of flapping links on route calculation and performance.

\* \* \* \* \*